Aug. 6, 1929.  A. J. CARTER  1,723,132
CONDENSER
Filed July 6, 1926

Inventor
Alva J. Carter
by Jabel & Banning Attys.

Patented Aug. 6, 1929.

1,723,132

UNITED STATES PATENT OFFICE.

ALVA J. CARTER, OF CHICAGO, ILLINOIS, ASSIGNOR TO CARTER RADIO COMPANY, OF CHICAGO, ILLINOIS, A CORPORATION OF ILLINOIS.

CONDENSER.

Application filed July 6, 1926. Serial No. 120,649.

My invention relates to condensers and more particularly to a condenser that is capable of a certain amount of adjustment to vary the capacity thereof.

It is a purpose of my invention to provide a condenser that is simple and compact in construction and that can be cheaply manufactured.

It is a further purpose of my invention to provide a condenser that is provided with means for adjusting the capacity thereof within certain limits and which is further provided with terminals that are adjustable to vary the relative position thereof so that the same can be connected conveniently to any electrical device with which the same is used.

It is particularly a purpose of the invention to provide a condenser comprising a pair of metallic plates having dielectric material therebetween that are mounted at a fixed distance from each other and a pair of bowed or dished plates spaced from said first mentioned plates by means of a layer of dielectric material and to provide clamping means connecting said bowed or dished plates adapted to draw the bowed or dished portions thereof toward each other to vary the capacity of the condenser. The fixed plates are connected each with one of the bowed plates and the connection is preferably made by means of ears on said plates that are connected together and which serve as terminals for mounting binding posts or other devices for securing the conductors thereto.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings,—

Figure 1:
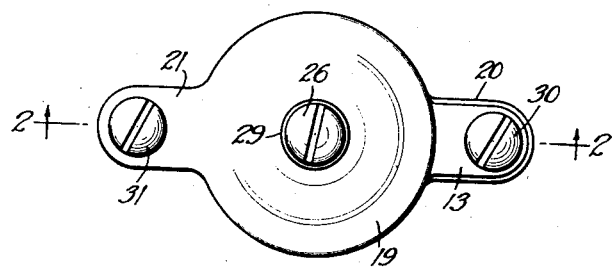
Fig. 1 is a plan view of my improved condenser.

Referring in detail to the drawings, my improved condenser comprises a pair of metallic plates 10 and 11 which are separated by means of plates 12 of dielectric material such as mica. The plates 12 are preferably disklike in form and the plates 10 and 11 are disklike except for the laterally extending ears 13 and 14 provided on the plates 10 and 11, respectively. The ears 13 and 14 are slightly offset as indicated at 15 so as to accommodate the disks or plates of dielectric material 12, 16 and 17 between the plates 10 and 11 and the dished outer plates 18 and 19, respectively. The plates 18 and 19 are of a dished or bowed disk-like form except for the ears 20 and 21 provided on the same. The concave sides of the members 18 and 19 are arranged to face each other and house the members 10, 11, 12, 16 and 17, between the same.

A clamping member, such as a bolt 22, extends through an opening 23 in the plate 19 and through an opening 24 of substantially the same size as the opening 23 in the plate 18. The plates 18 and 19 can thus be made duplicates. An insulating bushing 25 is provided having a flange 29 lying between the head 26 of the bolt 22 and the member 19, and a nut 27 cooperates with the bolt 22 to clamp the plates 18 and 19 together. The nut 27 is provided with a boss 40 for centering the same in the opening 24, thus centering the shaft 22.

Figure 2:
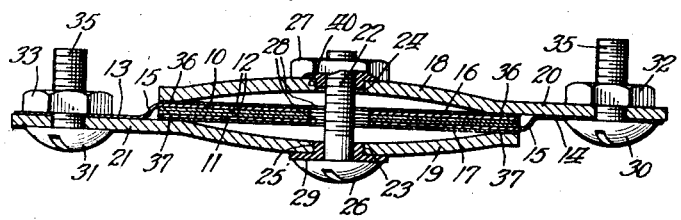
Fig. 2 is a section thereof taken on the line 2—2 of Fig. 1.

It will be noted upon reference to Fig. 2, that the members 10, 11, 12, 16 and 17 have aligning openings 28 provided centrally thereof larger than the diameter of the bolt 22 to space said members from the bolt. The bolts 30 and 31 are provided for clamping the ears 13 and 20, and the ears 14 and 21, respectively, together, the nuts 32 and 33 cooperating with the bolts 30 and 31 to clamp said parts in position. Said bolts 30 and 31 further act as binding posts on the ears for connecting the conductors thereto, said bolts being of such length that the shanks 34 and 35 thereof extend a considerable distance beyond the nuts 32 and 33.

It will be obvious upon reference to Fig. 2, that if the members 18 and 19 are made of sufficiently flexible material, the same can be drawn toward each other by tightening the nut 27 on the bolt 22 and it will further be noted that such movement of the plates 18 and 19 toward each other will vary the capacity of the condenser, the condenser thus having a pair of plates that are fixed relative to each other, that is, the plates 10 and 11 comprising a fixed element in the capacity of the device and the plates 18 and 19 being movable toward and away from each other due to the dished or bowed out portions thereof providing a variable element in the capacity of the condenser.

Figure 3:
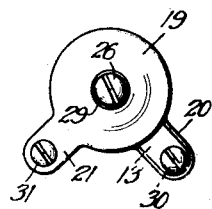
Fig. 3 is a plan view of the condenser showing the terminal ears in a different adjusted position than that of Fig. 1.

It will furthermore be noted that the bolt-like member 22 being centrally located serves as a central shaft or pivot around which the members 18 and 19 along with the members 10 and 11 may be turned to vary the angularity of the ears 20 and 21 relative to each other. Thus, in Fig. 1, the ears 20 and 21 are shown as being in transverse alignment or 180° apart, while in Fig. 3, the ears extend substantially at right angles to each other, it being obvious that any desired angularity can be obtained.

It will also be noted upon reference to Fig. 2, that the peripheries of the disks 18 and 19 are slightly flattened as indicated at 36 and 37, respectively, so as to prevent the same from biting into the members 16 and 17 when the clamping member is tightened to draw the members 18 and 19 toward each other. The bolt or other clamping member 22 thus serves as an adjusting means as well as a means for clamping the various plates of the condenser firmly together.

It will be noted that as the plates 18 and 19 have a certain amount of resiliency, these will act in a similar manner to lock washers in cooperation with the bolt and nut to hold the parts in firm assembled relationship.

Having thus described my invention, what I desire to claim and secure by United States Letters Patent is:

1. In a device of the character described, a pair of fixed plates and a pair of plates movable toward and away from each other, each of said movable plates being connected with one of said fixed plates and separated from the other plates by dielectric material.

2. In a device of the character described, a pair of flat plates and a pair of dished plates and means for clamping said plates together, certain of said plates being swingable relative to the other plates around said clamping means as an axis.

3. In a device of the character described, a pair of plates having their central portions bowed away from each other, a pair of flat plates mounted between said bowed plates, dielectric material separating said plates, each of said flat plates being electrically connected with one of said bowed plates and means extending through all of said plates for clamping said plates together, said clamping means being the sole means for holding said plates together.

4. In a device of the character described, a pair of plates having their central portions bowed away from each other, a pair of flat plates mounted between said bowed plates, dielectric material separating said plates, each of said flat plates being electrically connected with one of said bowed plates and means extending through all of said plates for adjustably clamping said plates together to vary the deflection of said bowed plates away from each other.

5. In a device of the character described, a pair of plates having portions bowed away from each other, a pair of flat plates mounted between said bowed plates, dielectric material separating said plates, each of said flat plates being electrically connected with one of said bowed plates and means for clamping said plates together, said clamping means swivelly connecting said plates.

6. In a device of the character described, a pair of plates having portions bowed away from each other, a pair of flat plates mounted between said bowed plates, dielectric material separating said plates, said flat plates and said bowed plates each having an ear projecting therefrom, means passing through said ears to secure and electrically connect one of said flat plates to each of said bowed plates, each of said flat plates being electrically connected with one of said bowed plates and means for clamping said plates together.

7. In a device of the character described, a pair of plates having portions bowed away from each other, a pair of flat plates mounted between said bowed plates, dielectric material separating said plates, said flat plates and said bowed plates each having a terminal ear projecting therefrom, means passing through said ears to secure and electrically connect one of said flat plates to each of said bowed plates, each of said flat plates being electrically connected with one of said bowed plates and means for clamping said plates together, said clamping means swivelly connecting said plates whereby said ears may be moved to any relative position.

8. A condenser comprising a pair of plates having a substantially fixed capacitative relation to each other, a pair of distortable plates each capacitatively associated with one of said first named plates, and conductively connected with the other of said first named plates, dielectric material between said plates and means for distorting said distortable plates to vary the capacity of said condenser.

9. In a condenser, a plurality of fixed plates, distortable plates each capacitatively associated with one of said first named plates and conductively connected with another of said first named plates and a single securing means serving to hold said fixed plates in position and adjustable to distort said distortable plates to vary the capacity of said condenser.

In witness whereof, I hereunto subscribe my name this 1st day of July A. D., 1926.

ALVA J. CARTER.